US006809700B2

(12) United States Patent
Benedict et al.

(10) Patent No.: US 6,809,700 B2
(45) Date of Patent: Oct. 26, 2004

(54) TAG HOUSING AND ASSEMBLY METHOD FOR ANNULAR APPARATUS

(75) Inventors: Robert Leon Benedict, Tallmadge, OH (US); Franz Josef Hillenmayer, Burglengenfeld (DE); Joseph Carmine Lettieri, Stow, OH (US); Peter Ross Shepler, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 170 days.

(21) Appl. No.: 10/320,026

(22) Filed: Dec. 16, 2002

(65) Prior Publication Data

US 2004/0017321 A1 Jan. 29, 2004

Related U.S. Application Data

(60) Provisional application No. 60/398,308, filed on Jul. 24, 2002.

(51) Int. Cl.[7] .................................................. H01Q 1/42
(52) U.S. Cl. ...................................... 343/872; 343/866
(58) Field of Search .................................. 343/711, 712, 343/872, 866; 235/492; 340/572.7, 572.8, 442, 445, 447

(56) References Cited

U.S. PATENT DOCUMENTS

| 5,119,066 A | | 6/1992 | Ballyns ...................... 340/442 |
|---|---|---|---|
| 6,255,940 B1 | * | 7/2001 | Phelan et al. ............... 340/447 |
| 6,357,833 B1 | | 3/2002 | Bajer .......................... 301/95 |
| 6,386,254 B1 | | 5/2002 | Koch et al. .................. 152/216 |
| 6,443,198 B1 | * | 9/2002 | Koch et al. ............... 152/152.1 |
| 2004/0074974 A1 | * | 4/2004 | Senba et al. ................ 235/492 |

FOREIGN PATENT DOCUMENTS

| DE | 199 24 830 A 1 | 11/2000 | ........... B60C/23/20 |
|---|---|---|---|
| EP | 1024034 | 8/2000 | ........... B60C/23/04 |
| EP | 1310386 | 5/2003 | ........... B60C/23/04 |
| WO | WO 99/29522 | 6/1999 | ........... B60C/23/04 |
| WO | 9929525 | 6/1999 | ........... B60C/23/04 |
| WO | WO 99/52723 | 10/1999 | ........... B60C/23/04 |
| WO | WO 99/53740 | 10/1999 | ........... B60C/23/04 |
| WO | WO 01/12452 | 2/2001 | ........... B60C/23/04 |
| WO | WO 01/12453 | 2/2001 | ........... B60C/23/06 |
| WO | WO 01/36220 | 5/2001 | ........... B60C/23/04 |

* cited by examiner

*Primary Examiner*—Hoang V. Nguyen
(74) *Attorney, Agent, or Firm*—Richard B. O'Planick

(57) ABSTRACT

A housing for a tag assembly comprises an internal chamber defined by sidewalls and a bottom wall; a peripheral flange projecting from the housing; convergent surfaces extending at an upper housing end to an upper surface; and a sensor portal projecting through the housing upper surface in communication with the housing chamber. The housing is positioned within a mold block with the upper housing end resident within a mold block cavity. An upper surface of the peripheral flange and housing sidewall superior to the flange abut sidewall portions of the mold block to isolate the upper housing end with the cavity while carrier strip material is induced into the mold to partially embed the housing therein. An annular apparatus is thus formed comprising an annular carrier strip having a transponder housing at least partially embedded therein in which an upper housing end remains free of the carrier strip.

20 Claims, 8 Drawing Sheets

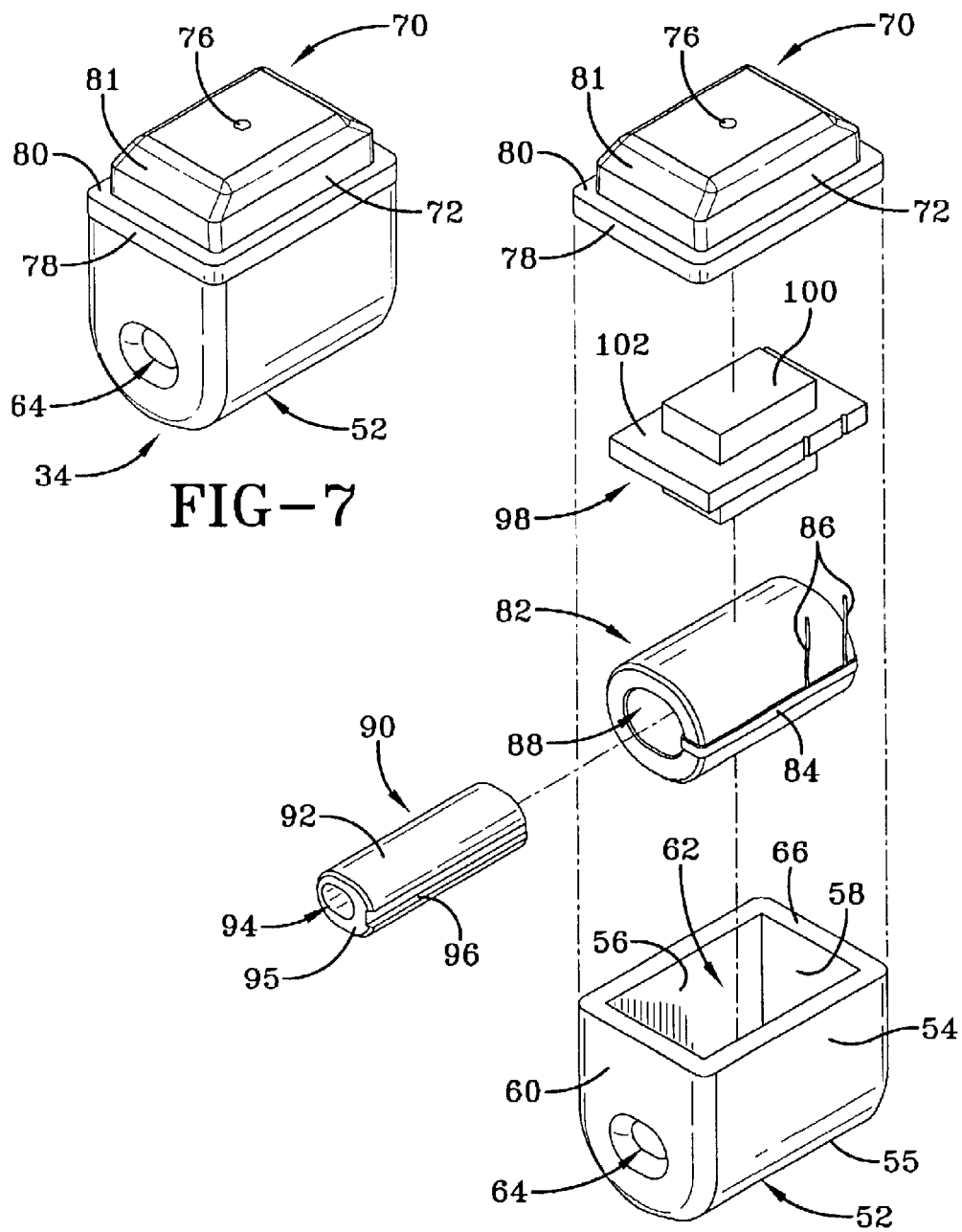

TAG HOUSING AND ASSEMBLY METHOD FOR ANNULAR APPARATUS

This application claims the benefit of Provisional Application No. 60/398,308 filed on Jul. 24, 2002.

FIELD OF THE INVENTION

The invention relates generally to annular apparatus for use in tire monitoring systems and, more specifically, to a tag housing and assembly method for such annular apparatus.

BACKGROUND OF THE INVENTION

This invention relates to an annular apparatus, including an antenna for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data. The subject invention is specifically directed to an assembly method and tag housing for annular apparatus used in tire monitoring systems.

As is evidenced by the references described below, it is known in the art to employ an annular antenna to transmit, at radio frequencies, data from a transponder contained within the structure of a tire or tire and wheel assembly. In practice, however, it is very difficult to do this with an antenna incorporated into the tire during the course of its manufacture. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity during the diametric enlargement of the tire during its manufacture. Furthermore, the annular antenna must be able to survive the repeated deformations occurring during tire use and the rigors imparted by testing procedures to which tires are subjected before retreading. Accordingly, a need exists for an annular apparatus and method sufficient to maintain mechanical and structural integrity in the transponder-antenna loop connection during the diametric enlargement of the tire during the building and curing process. In addition, the antenna and the transponder-antenna loop connection must be durable and able to maintain structural integrity throughout the rigors of tire operation and retreading procedures without degradation in performance or malfunction due to breakage of wire or electrical connections.

A magnetic coupling between an antenna and a transponder in an annular assembly is typically effected by means of a toroidal transformer. The antenna is coupled to the transformer by means of a primary winding and the transponder by means of a secondary winding. The mechanical connections of the antenna and transponder to the transformer, however, are subject to failure due to stresses generated in the tire during manufacture or subsequent use. It has been proposed to employ a toroidal transformer body in which the antenna and the transformer are directly coupled by the passage of the antenna directly through the toroid opening. Electrical coupling occurs between the loop and the toroid, and therefore into the secondary winding because the current induced in the loop antenna from the transceiver magnetic field creates a magnetic near the loop. The magnetic field is induced directly into the toroid that closely surrounds the antenna loop wire(s). Such a relationship between the antenna and toroid avoids the problems attendant the prior art that utilize a fixed connection or winding between the antenna and transformer.

It has further been proposed to encapsulate the antenna, transformer, and transponder within an annular strip or ring formed of electrically insulating, elastomeric material. The system components are positioned within a mold and the carrier strip material is induced into the mold and surrounds the components. A unitary annular system is thereby created allowing for convenient integration of the system to a tire by adhesive in a post tire build operation. Encapsulating an antenna, toroidal transformer, and transponder in a carrier strip in order to create the unitary ring assembly, however, carries certain challenges and risks. The relative positions of the antenna, transformer, and transducer must be maintained. Moreover, the integrity of the connections between the associated components must be maintained. In addition, the sensors and communication electronics of the transponder must be protected from damage or contamination due to exposure to the introduction of the carrier strip material.

Accordingly, there is needed a tag housing and assembly method for an annular apparatus including a transponder, transformer, and antenna that facilitates the integration and assembly of the annular apparatus into a carrier strip. The tag housing must serve to maintain the relative orientation of the transponder, transformer, and antenna during their incorporation into a carrier strip or ring; preserve the integrity of the connections between the associated components; and protect the components from damage or contamination from the carrier strip material molded therearound. Moreover, a satisfactory tag housing and assembly method will be economical to fabricate, implement, and deploy and facilitate efficient performance of the transformer, transponder, and antenna in monitoring the condition of a tire.

SUMMARY OF THE INVENTION

The subject invention satisfies the need for a tag housing and assembly method for annular apparatus for tire monitoring systems. The tag housing includes a base component having an elongate configuration comprising spaced apart sidewalls, a bottom wall, and end walls that define an internal compartment therebetween. A through bore extends through the end walls and creates with the internal compartment a through passageway through the housing base. A toroidal transformer, in one embodiment, having a through bore is positioned within the housing base component so that the transformer through bore axially aligns with the through bore of the base housing component. A transponder circuit board including sensors and associated electronics is mounted within the internal compartment of the housing base component above the transformer and an electrical coupling is established between the transponder and the transformer. A cap component is provided to enclose the housing and seals against an upper surface of the base component. The cap is generally pyramidal having a lower rim flange, vertical sidewall portions that intersect the rim flange, and upper sidewall portions that taper inward to a flat top surface. The tapered upper portion of the cap defines, generally, the housing "snout". An aperture or portal is disposed to extend through a median portion of the top surface. The vertical sidewall portions and an upper ledge surface of the rim flange intersect at a substantially right angle.

A coupling of the antenna loop is effected in a coupling with the transformer toroid, preferably, but not necessarily, by passing the antenna loop through the housing through bore to electro-magnetically couple the antenna to the transformer.

The inward taper and stepped profile of the tag housing facilitates a self centering registry of the housing within a mold cavity. The upper ledge surface of the rim flange and the vertical sidewall portions abut against sidewall portions defining the mold cavity to center and isolate the housing snout in a protected region of the mold cavity. The mold is closed and carrier strip material is induced into the mold surrounding a lower portion of the housing and the annular antenna. Pressure from the induced material serves to influence the housing cap into the mold block cavity and further enhances the seal between abutting surfaces of the cap the mold block. The mold block cavity surrounding the port within the upper surface of the cap is thereby maintained in a material free state any entry of carrier strip material through the tag housing port that would otherwise contaminate or damage transponder sensors or electronics is avoided.

In the finished form, the carrier strip, antenna, and tag housing represent a unitary ring assembly that is readily transported, inventoried, handled, and affixed to a tire sidewall by suitable adhesives. The snout of the tag housing extends free of the carrier strip and is positioned by the carrier strip in an exposed relationship with the tire cavity. Consequently, with the annular apparatus attached to a tire liner, the transponder sensors within the housing are in direct communication with the tire cavity through the housing port and a positive and accurate reading of monitored tire cavity parameters is facilitated.

According to another aspect of the invention, the tag housing is elongate and is partially embedded within the carrier strip in either an "on end" or a "flat" orientation. In the "on end" orientation the tag housing snout projects a relatively greater distance into the tire cavity, but the reduced attachment length along the sidewall radial direction reduces the effect of the rigid tag on tire sidewall bending. In the "flat" orientation, the mounted transponder housing assumes a lower profile and the bending influence of centrifugal force on the tag housing from operation of the tire is reduced.

These and other aspects of the invention, which will be apparent to those skilled in the art, are achieved by preferred and alternative embodiments that are described in detail below and illustrated by the accompanying drawings.

BRIEF DESCRIPTION OF THE DRAWINGS

FIG. 7 is a front perspective view of the subject transponder module.

FIG. 8 is an exploded perspective view thereof

DEFINITIONS

Figure 1:
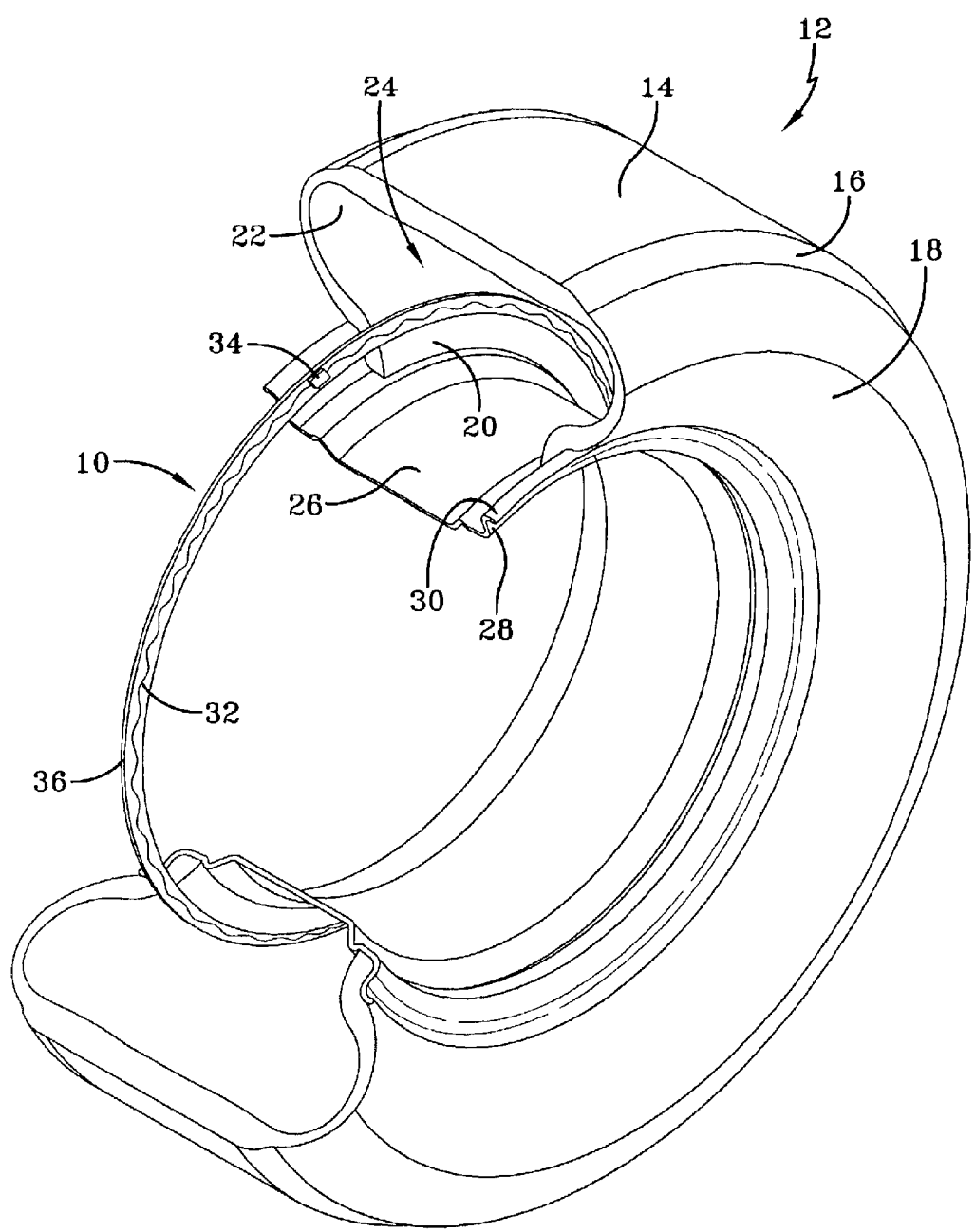
FIG. 1 is a perspective view of a tire and the subject annular apparatus with portions of the tire removed for the purpose of illustration.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements.

"Circumferential" most often means circular lines or directions extending along the perimeter of the surface of the annular tread perpendicular to the axial directs; it can also refer to the direction of the sets of adjacent circular curves whose radii define the axial curvature of the tread, as viewed in cross section.

"Inner" means toward the inside of the tire and "outer" means toward its exterior.

"Lateral" means in a direction parallel to the axial direction.

"Radial" and "radially" mean directions radially toward or away from the axis of rotation of the tire.

"Shoulder" means the upper portion of sidewall just below the tread edge.

"Sidewall" means that portion of tire between the tread and the bead.

DETAILED DESCRIPTION OF THE PREFERRED EMBODIMENTS

As used herein, a "transponder" is an electronic apparatus (device) capable of monitoring a condition such as air pressure within a pneumatic tire, and then transmitting that information to an external device. The external device can be either an RF (radio frequency) reader/interrogator or, simply an RF receiver. A simple receiver can be used when the transponder is "active", and has its own power source. A reader/interrogator would be used when the transponder is "passive" and is powered by an RF signal from the reader/interrogator. In either case, in conjunction with the external device, the transponder forms a component of an overall tire-condition monitoring/warning system. A toroidal body composed of a material of high electro-magnetic permeability is coupled to the transponder by a winding. In conventional systems, the antenna is coupled to the toroidal body by means of a primary winding and the transponder is coupled to the toroidal body by means of a secondary winding. As explained below, the primary winding is eliminated in the preferred embodiment. The "secondary" winding that couples a transponder to the toroidal body hence is referred to herein as merely the "winding". For the purpose of the subject disclosure and the invention, the annular system is not transponder specific. That is, a wide range of commonly available transponders, sensors, and associated electronics may be packaged and utilized with the subject invention.

As used herein, a "toroid" is a body formed from material having a high elector-magnetic permeability by a continuous curved surface and includes a central through bore. The toroidal body may be cylindrical, oblong, symmetrical, or asymmetrical without departing from the invention herein set forth.

In order to send or receive RF signals, a transponder must have an antenna. The antenna is annular in configuration in the subject invention and may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The antenna may comprise a single wire or a plurality of strands. Various commercially available transponders, sensors, and other electrical devices deployed in combination with an annular antenna formed from conventional conductive materials are suitable for use in conformance with the principles of the subject invention.

Acceptable materials for the antenna wire include steel, aluminum, copper or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, flexible circuits, conductive film, conductive rubber, etc.

Referring initially to FIG. 1, a preferred embodiment 10 of an annular assembly is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use explained below.

With continued reference to FIG. 1, a transponder module 34 of the general type described above is provided and may include means for sensing tire parameters such as pressure and temperature. Included as part of the apparatus 10 is a carrier strip of material 36 formed into the annular ring configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the transponder module 34 in the manner described below. In the post manufacturing state, therefore, the apparatus 10 comprising antenna 32, transponder module 34, and carrier strip 36, in a unitary, generally circular, semi-rigid assembly that is readily transportable and handled for attachment to tire 12. The diameter of the apparatus assembly 10 is a function of the size of the tire 12 and the preferred attachment location thereon.

Figure 2:
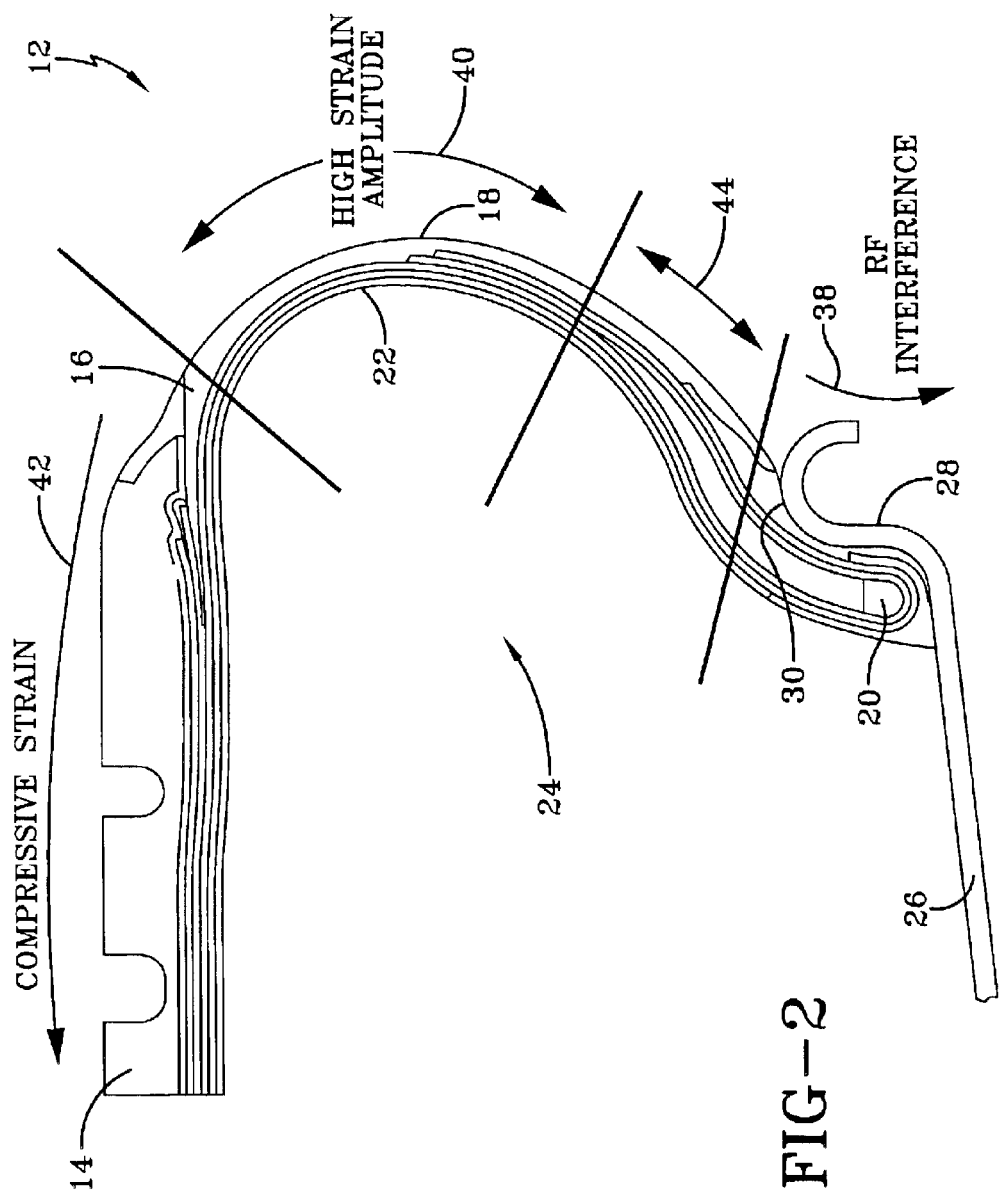
FIG. 2 is a sectional schematic of a tire mounted to a rim and illustrating alternative locations in which to mount the subject annular apparatus.

FIG. 2 illustrates a preferred location for annular apparatus 10 on a tire in accordance with the present invention. The tire 12 is mounted to a rim 26 in conventional fashion. The bead 20 of tire 12 is disposed within the rim 26 against flange 28. Upper surface 30 of the flange 28 is located above a lower edge of the tire bead 20. As will be appreciated, the flange 28 shields the lower portion of the tire 12 comprising bead 20 and defines an "RF INTERFERENCE" region 38 of the tire. A region 40 of tire 12 above region 38 at the sidewall 18 is further defined as a "HIGH STRAIN AMPLITUDE" region. As sidewall 18 flexes during operation of the tire on a vehicle, region 40 experiences a high level of strain. The region 42 located at the tread portion of the tire is referred to herein for explanatory purposes as a "COMPRESSIVE STRAIN" region. It is at region 42 that the tire 12 experiences a high level of compressive strain as the tire is operatively utilized.

In combined reference to FIGS. 1 and 2, the apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture. Adhesives commonly utilized in the industry for tire patch and repair may be employed. The location on the tire to which apparatus 10 is attached pursuant to the instant invention is region 44 in FIG. 2, located between the RF INTERFERENCE region 38 and the HIGH STRAIN AMPLITUDE region 40. It will be appreciated that region 38 would be equitable from a mechanical perspective since tire region 38 is relatively rigid, protected by rim flange 28, and, experiences a relatively low strain level during operation of the tire. From an electrical perspective, however, region 38 of the tire 12, shielded by rim flange 28, is ill suited as a location for the transponder 34.

Location of the apparatus 10 within region 40 of the tire sidewall 18 is an option. Such a location would avoid the RF Interference caused by the rim. However, the tire sidewall 18 experiences high levels of strain during operation of the tire. Consequent damage to or breakage of components affixed to the sidewall may occur. Similarly, location of the apparatus 10 at the tread region 42 of tire 12 would avoid RF Interference from the rim but the tread region experiences high compression strain during operation of the tire. Location of tire monitoring system devices in such a location would be therefore be undesirable from a mechanical perspective.

Consequently, apparatus 10 is preferably located within region 44 of the tire 12. Region 44 is generally an annular region located substantially between 10 to 30 millimeters above the upper surface 30 of the rim flange 28 when tire 12 is mounted to rim 26. Within region 44, the apparatus is free from RF Interference from the flange 28 of rim 26. Region 44 is further a relatively low strain amplitude region of the tire 12. Thus, region 44 of the tire 12 represents an optimal location for apparatus 10 that balances the need for minimal RF Interference from the rim while mechanically protecting the apparatus 10 from damage due to strain forces introduced into the tire during its operation.

Figure 3:
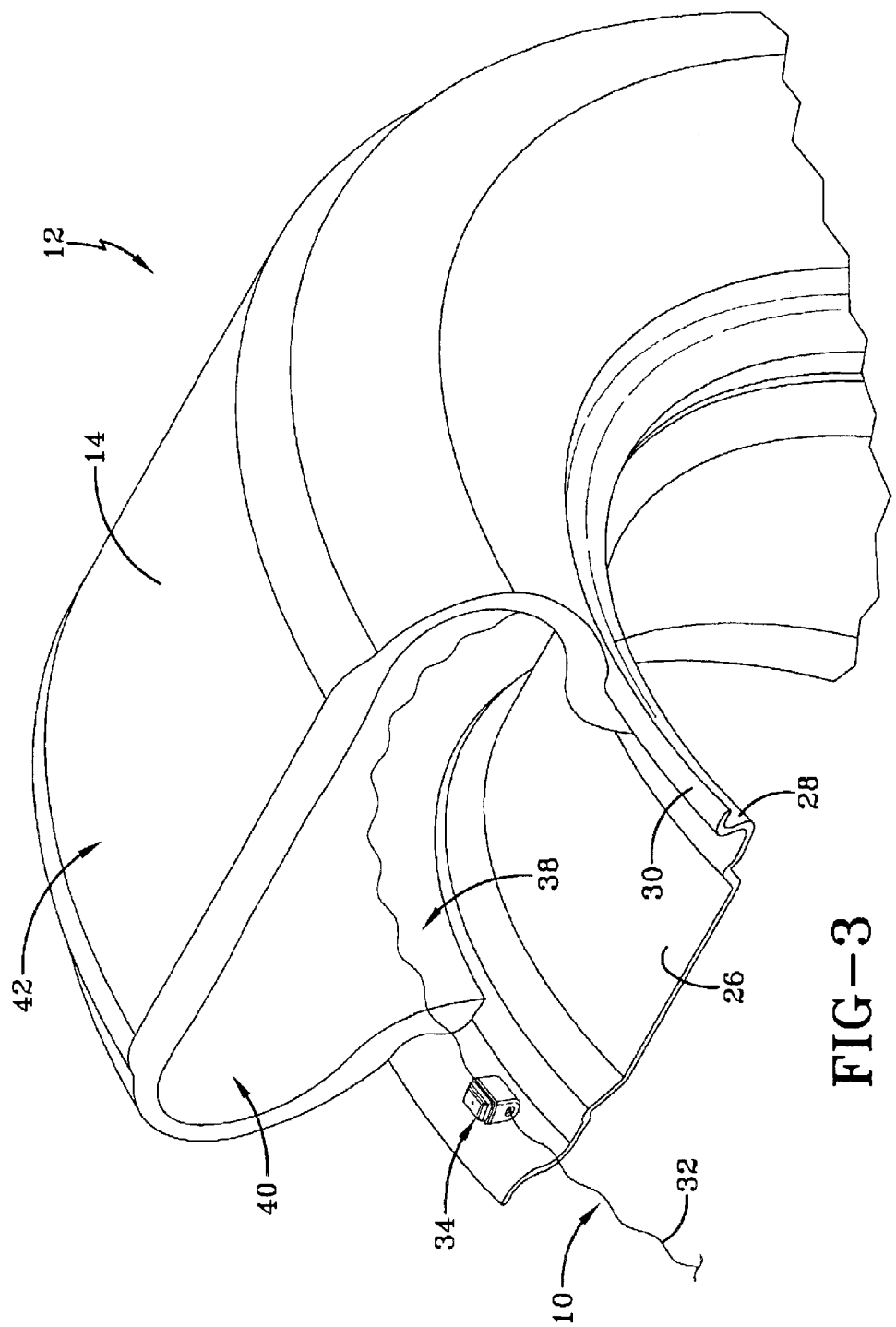
FIG. 3 is an enlarged perspective view of a tire portion having a transponder and antenna assembly positioned against a tire sidewall surface.

FIG. 3 illustrates an alternative embodiment of the subject apparatus 10 in which the carrier strip 36 is eliminated and the antenna 32 and transponder 34 are embedded directly within the tire 12 during its manufacture. The location of the antenna 32, again, is within region 44 described as optimal in the preceding paragraph; that is, approximately 10–30 millimeters above the rim flange surface 30 when tire 12 is mounted to rim 26. Attaching the apparatus 10 into tire 12 during its manufacture is possible pursuant to the invention but is not preferred since such a procedure would necessarily expose the transponder 34 and antenna to potentially damaging forces as the tire is formed. Also, implanting an exposed annular antenna 32 and transducer 34 makes replacement and repair of the assembly in the event of damage or breakage problematic. Consequently, it is preferable to attach the apparatus 10 to the tire 12 in a post manufacture process by adhesives or the like. The advantages of post manufacture assembly is that the apparatus 10 is spared the stress of the tire manufacturing process and the apparatus 10 may readily be removed and replaced in the event of breakage. Moreover, the unitary apparatus 10 shown in FIG. 1 may readily be retrofitted by adhesive to pre-manufactured or used tires. Finally, the annular apparatus is a unitary assembly and may be conveniently inventoried in a range of diametric sizes so as to fit various sized pre-manufactured tires.

Figure 4:
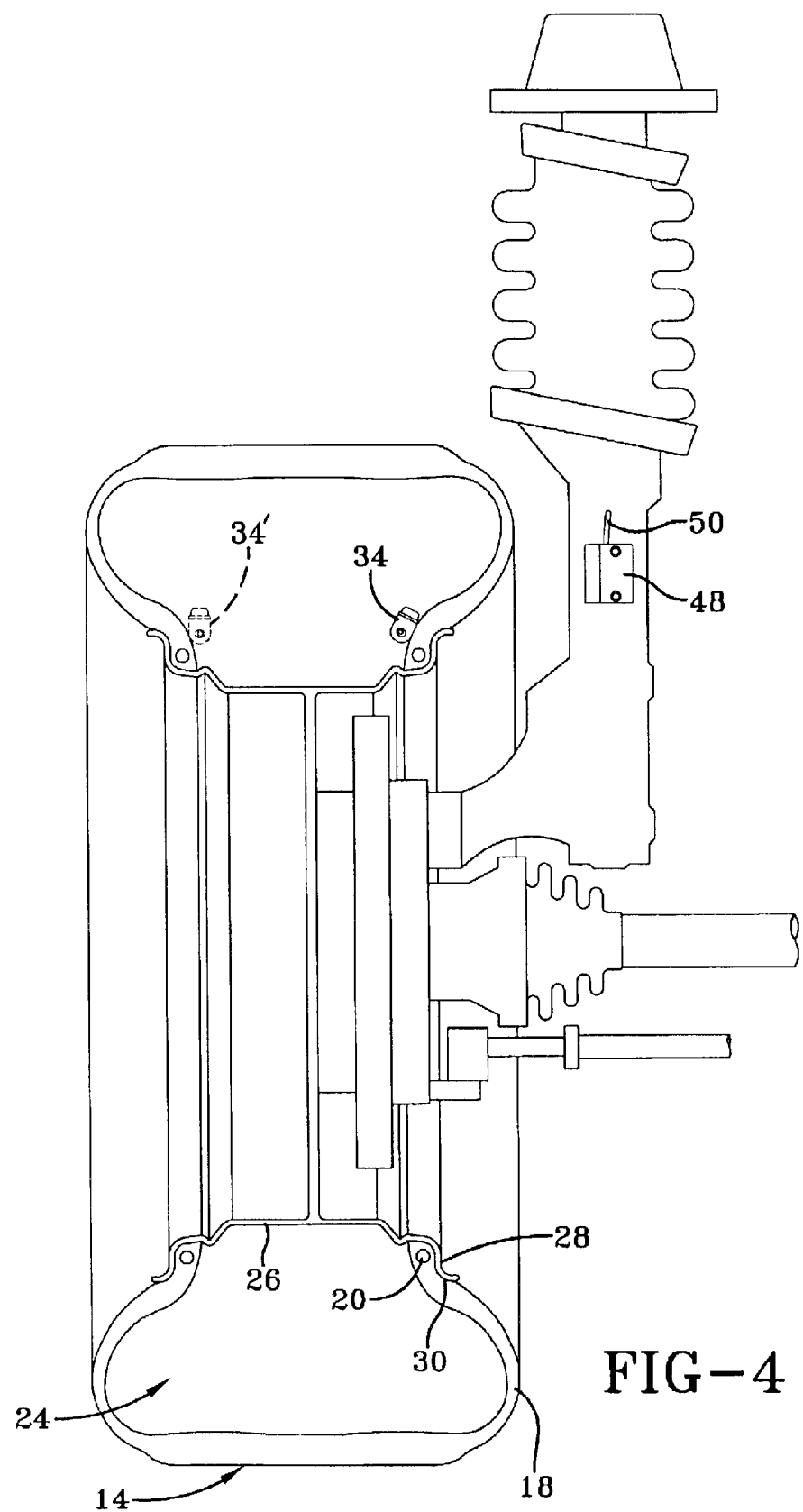
FIG. 4 is a sectional schematic view of a tire and wheel assembly mounted to a vehicle frame.

FIG. 4 shows the transponder module 34 located at its preferred location on a tire 14 and exposed to the tire cavity 24. The transponder may include pressure and temperature sensors for monitoring the status of the cavity 24 and communicate such information to a remote transceiver 48 mounted to the vehicle frame 46. The transceiver 48 is positioned opposite the antenna of the apparatus 10 and is in continuous communication therewith throughout the 360 degrees rotation of the tire 14. Transceiver 48 is of a type commercially available in the industry and is electrically connected by lead 50 to conventional logic, processing and display electronics of the vehicle (not shown). As described previously, the position of the transponder module 34 is above the rim flange 28 so that RF communication between the transponder and the transceiver 48 is not impaired.

With collective reference to FIGS. 5–12, the configuration of the annular apparatus 10 will be explained in greater detail. The transponder module generally comprises a tag base housing 52 formed of rubber or plastic material by conventional means. The housing 52 includes opposite sidewalls 54, 56 joining along a radiused bottom surface 55 to opposite vertical end walls 58, 60. The walls 54, 55, 56, 58, and 60 define a central compartment 62. A through bore 64 extends through lower portion of the end walls 58, 60 in communication with the compartment 62.

The housing 52 further includes a cap member 68 likewise formed of conventional rubber or plastic material by conventional means such as induction molding. The cap member 68 includes an inward tapered upper protrusion or "snout" 70. A flange 78 peripherally defines a lower boundary of cap 68 and provides a horizontal ledge surface 80. Vertical sidewalls of cap 68 extend from the ledge surface 80 at substantially a right angle and adjoin upper cap surfaces 81 that taper inward to a flat top surface 74. A central sensor port 76 is disposed to project through the top surface 74 and communicate with the housing compartment 62. An underside of the flange 78 is dimensioned to rest upon the upper surface of the module base housing 52 and the juncture may be sealed by common sealants to create a unitary housing comprising the base 52 and the cap 68.

The housing comprising the preferred embodiment of the subject invention is thus quadrilateral and symmetric, elongate in a longitudinal direction, and configured having an inwardly stepped profile at an upper end. While preferred, other shapes and configurations may be substituted and utilized for the housing while not departing from the invention. By way of example, without any limitation intended, the tag housing may be cylindrical having arcuate sidewalls stepped inward at the top or be asymmetrically configured to accommodate the configuration of the circuit board, transponder sensors, and/or electronics if desired or required.

In the illustrated embodiment, the transponder module 34 further includes a toroidal body (toroid) 82 composed of a material, such as a ferrite, having a high electro-magnetic permeability. The body 82 generally comprises a cylinder having an elliptical cross-sectional configuration. The elliptical sectional configuration of body 82 serves to reduce its vertical dimension and allows for a more compact packaging of the body 82 within the transponder module. The body 82 includes a winding 84, as shown, terminated to conductor leads 86. A central through bore 88 projects through the body 82 in an axial or longitudinal direction.

A protective sleeve member 90 is further provided sized for receipt and residence with the bore 88 of body 82. The sleeve 90 comprises generally an elongate cylinder having an elliptical cross-section. The sleeve 90 further includes a circumferential sidewall 92 and an axial or longitudinal through bore 94. Bore 94 is offset relative to the longitudinal axis of the sleeve 90 so as to create a wall 95 of increased thickness at an outward side of the sleeve 90. An outwardly open longitudinal channel 96 is formed within the wall 95 as shown. The sleeve 90 is closely received within bore 88 of body 82 and winding 84 is received within the channel 96 of sleeve 90.

With continued reference to FIGS. 5–12, a circuit board 98 mounts within the central compartment 62 of the transponder base housing 52. Circuit board 98 is typically configured to comprise an electronic package 100 mounted to an upper surface 102 and may include an electronic package 106 mounted to an underside 104. The electronic packages 100, 106 are generically depicted in FIGS. 5–12 and include the transponder sensors, logic, and RF transmitting systems necessary to perform tire cavity monitoring activity. The subject invention is not transponder design specific and any one of multiple conventional transponder systems may be utilized and mounted to one or both surfaces 100, 104 of circuit board 98. The board 98 further includes lead receiving channels 108 fabricated within a board side.

Assembly of the transponder module proceeds generally as follows. The sleeve 90 is inserted within the through bore 88 of the toroidal body 82 which is then inserted into the chamber 62 of the housing base 52. Situated within chamber 62, the through bore 94 of sleeve 90 and the bore 99 of body 82 co-axially align with housing through bore 64. The winding 84 of body 82 is received within channel 96 of the sleeve 90 and leads 86 are routed upward. The number of turns in winding 84 is designed to impedance match the transponder electronics in a conventional manner. The board 98 mounts horizontally in the preferred embodiment within the housing 52 above the sleeve 90 and the toroidal body 82 through passage. Leads 86 from the winding 84 are routed into the channels 108 and electrically connect to the electronics 100, 106 on circuit board 98. The peripheral flange 78 of the cap member 68 is thereafter positioned upon the upper surface 66 of the housing 52 and the interface is sealed by application of a suitable adhesive.

In the assembled condition, the transponder module 34 is as shown in FIG. 7. The transponder module housing, internal assembly, and component orientation may be varied if desired in the practice of the invention. The transponder module 34 thus comprises a sealed self contained unit that includes circuit board and transponder electronics for monitoring parameters of a tire cavity such as pressure and temperature. The electronics of the transponder module 34 may further include tire identification information. The toroidal body 82 is electro-magnetically and mechanically coupled to the transponder package 24 via winding 84.

Figure 5:
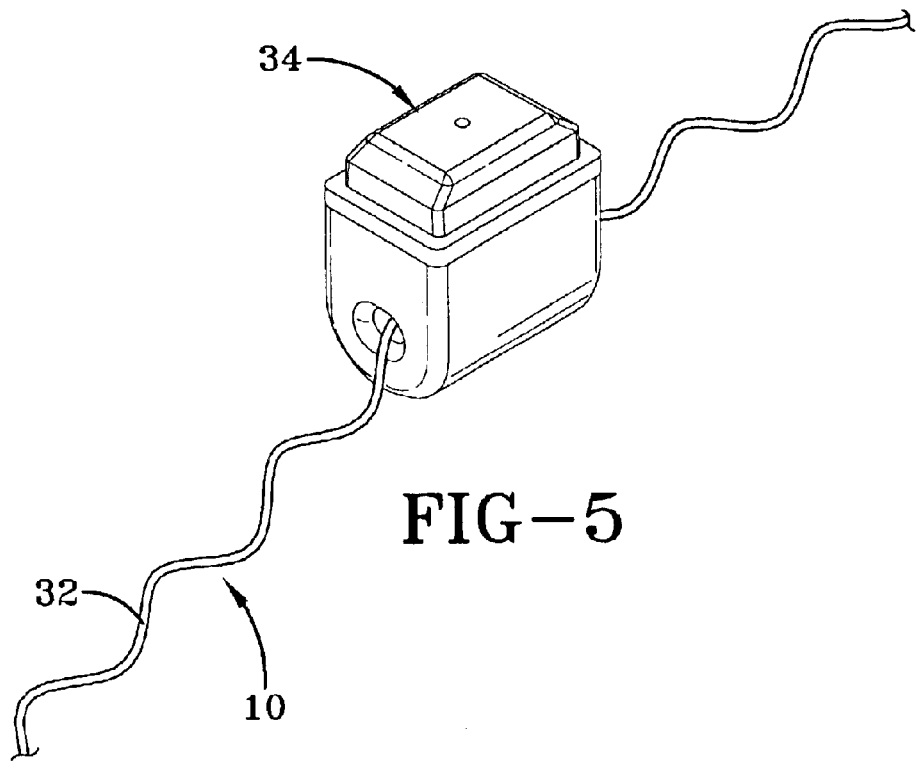
FIG. 5 is an enlarged perspective view of the subject antenna projecting through a transponder module.

The antenna 32 is routed through the transponder module 34 as seen best from FIG. 5 and comprises a continuous loop. The antenna 32 in the preferred embodiment is formed into a sinusoidal configuration; the sinusoidal shape serving to provide antenna elongation capacity with which to counter strain forces in the tire from its operation. The antenna 32 projects through bore 94 of sleeve 90, the bore 88 of body 82, and the through bore 64 of housing 52 in non-contacting manner. The antenna 32 is thus electro-magnetically coupled while mechanically decoupled from the transponder module 34. It will be noted that the toroidal body 82 functions as a transformer in which the primary winding is eliminated. The antenna loop 32 is passed directly through the through bore 88 of the toroid 82 and couples magnetically with the body absent a primary winding. Electrical coupling occurs between the loop 32 and the toroidal body 82, and therefore into the winding 84 because the current induced in the loop antenna 32 from the transceiver 48 magnetic field creates a magnetic near the loop. The magnetic field is induced directly into the toroidal body 82 that closely surrounds the antenna loop wire(s) 32.

Such a coupling, designated herein as Direct Magnetic Coupling (DMC), affords several distinct advantages. The DMC approach allows the antenna loop to pass through the transponder package without a mechanical connection and therefore eliminates the problems with making and maintaining a connection between the loop wire and the transponder package discussed previously. The winding 84 turn ratio may be varied to accommodate optimum impedance matching. Secondly, the DMC technique provides a high energy coupling. Furthermore, the process of attaching the antenna loop to a transponder is simplified rendering the remote coupling between wire bundles or cables and transponders substantially less difficult. Moreover, the magnetic coupling between annular antenna and transponder using the DMC technique is maintained in a continuous 360 degree read and dead zones in the interrogation area are avoided. While a direct magnetic coupling between the antenna and the transformer is preferred in the embodiment shown, a direct coupling is not mandatory to the practice of the subject invention. A winding or other known technique may be utilized to couple the antenna to the transformer if desired.

The assembly of FIG. 5 may be embedded into a tire during its manufacture, resulting in the tire assembly shown in FIG. 3, although it is not preferable to do so. Incorporation of the annular apparatus during tire build imposes substantial strain into the tire monitoring components and may result in component breakage. In a post cure state, removal of an annular assembly or any component therein may be difficult or impossible. Consequently, it is preferred that the subject annular assembly be affixed to a tire as a post tire build operation.

Figure 6:
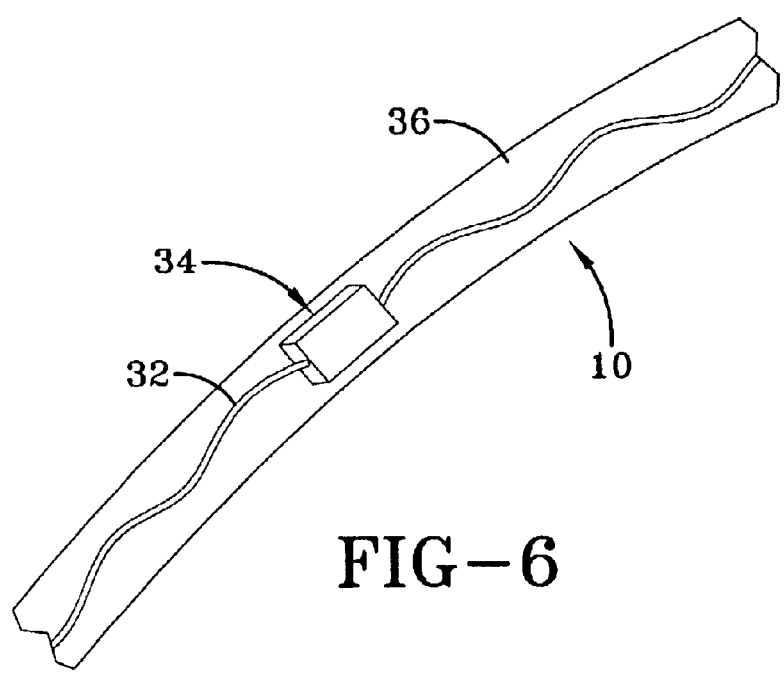
FIG. 6 is an enlarged perspective view of a portion of the subject annular assembly.
Figure 9:
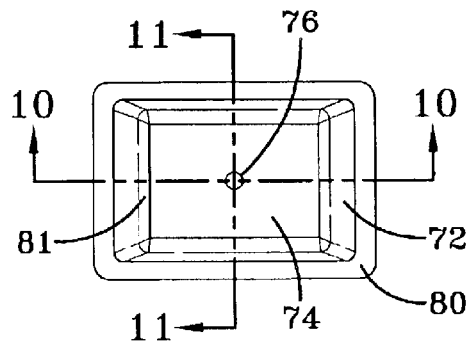
FIG. 9 is a top plan view thereof
Figure 10:
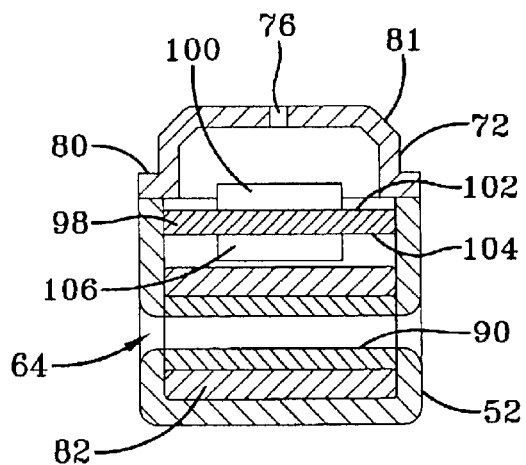
FIG. 10 is a longitudinal section view through the transponder module of FIG. 9 taken along the line 10—10.
Figure 11:
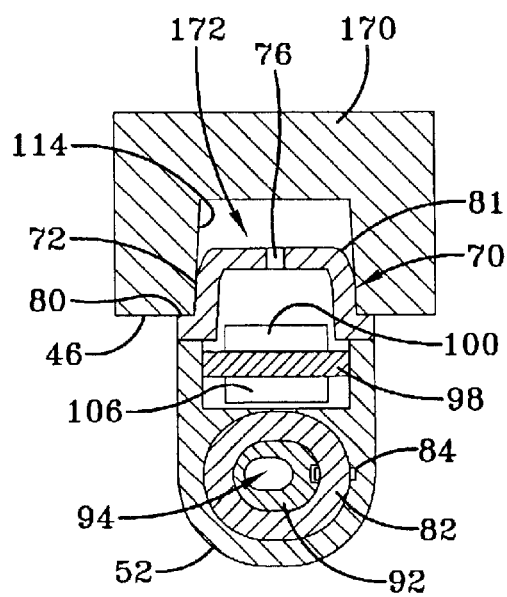
FIG. 11 is a transverse section view through the transponder module of FIG. 9 taken along the line 11—11.
Figure 12:
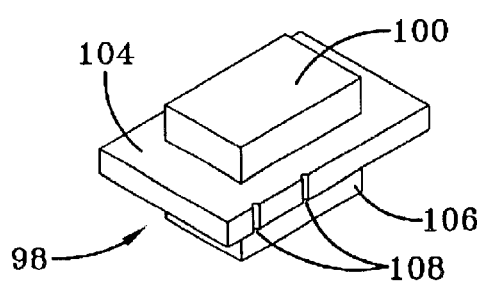
FIG. 12 is a perspective view of the module circuit board.
Figure 13:
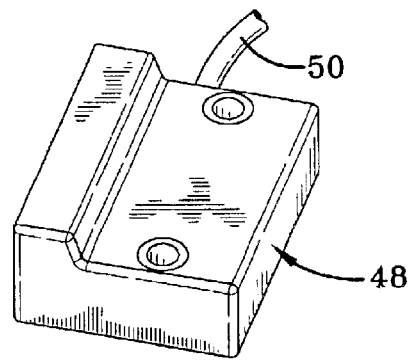
FIG. 13 is a perspective view of the receiver module.

To do so, the antenna 32 and transponder module sub-assembly are first embedded within a rigid or semi-rigid carrier strip 36 shown in FIGS. 1 and 6. The strip 36 is formed from a non-conductive encapsulant material such as rubber or plastic and an annular assembly results that is unitary and readily transported, stored, and handled. Creation of a unitary combination of antenna, transponder, and carrier strip facilitates ease of incorporation of the annular assembly into a tire in a post build procedure. The assembly is positioned against the tire liner 22 at a location within the optimum region 44 discussed previously. The strip 36 is adhered to the tire by application of commonly available adhesives. Should the antenna transponder module break in transit or malfunction, the assembly 10 may be removed and replaced without damaging the tire. Moreover, the encapsulant material further serves to maintain the antenna and the toroidal body in their intended mutual orientation.

In order to facilitate the ready incorporation of the transponder module 34 into the carrier strip 36, the housing of the transponder 34 comprising cap 68 and base housing 52 are of a unique stepped and tapered configuration. The cap comprises the tapered snout 70 at an upper end defined by inward tapering surfaces 81. The cap 68 steps outward at the lower peripheral edge flange 78. As best viewed from FIGS. 7 and 11, the housing snout 70 is received within a cavity 112 within a mold block 110. The tapered profile renders the transponder housing self registering and centers the housing within cavity 112 prior to introduction of the carrier strip material. In the centered position, sidewalls 114 of the mold block 110 closely abut against cap surfaces 72 and lower surfaces 115 of block 110 abut the upper surface 80 of cap flange 78 to isolate and protect the snout 70 of cap 68 within the mold cavity 112. The serpentine route created between the abutting surfaces of the housing and the mold block inhibits the progress of induced carrier strip material into the cavity, down the sensor port 76, and into the housing compartment 62. A bottom half of the mold block (not shown in FIG. 11) closes against the lower surfaces 115 of block 110 and material to form the carrier strip 36 is introduced into the mold cavity. Abutting surfaces 114, 115 and cap surfaces 72, 80 prevent the carrier material from entering cavity 112 and thereupon invading the transponder aperture 76. Material forming the carrier strip 36, in the shown embodiment, is filled up to the surface 80 of the flange 78, entirely encapsulating the antenna 32 and partially encapsulating the base 52 of the transponder module 34. The degree to which the housing and antenna are encapsulated into the carrier strip 36, however, may be varied if required or desired.

The mold halves are separated and the annular carrier strip with integrally captured antenna and transponder package removed from the mold. The subject annular assembly is thereafter affixed to the inner liner 22 of the tire 12 in the manner described previously and shown in FIGS. 1 and 6. The transponder module 34 may be oriented flat against the carrier strip as shown in FIG. 3 or oriented on end as shown in broken line at 34. Whichever orientation is utilized, the strip material 36 serves to maintain the transponder and antenna in a preferred optimal mutual orientation and the transponder module 34 in an optimal orientation relative to the tire cavity. The port 76 in the upper surface 74 of the cap 68 is maintained open and exposed to the tire cavity 24 and projects free of the carrier strip 36. Direct communication between the tire cavity 24 and sensors mounted to the circuit board 98 is thereby facilitated through port 76. The stepped and tapered configuration of the transponder module 34 is preferred in order to make the module self centering in the mold and to allow a seal to be established between the mold and outer surfaces of the transponder module. The annular path defined between ledge surface 80 and vertical surface, sidewalls 72 of cap 68 and the inward facing surfaces of mold sidewalls 114 deters the flow of carrier material into cavity 112. Were the flow of material so not inhibited, the material could enter cavity 112 and proceed through port 76 to the circuit board 90. The electronics and sensors mounted upon circuit board 98 are thus protected during the process of molding carrier strip 36 around the transponder module base 52 by the stepped configuration of the transponder housing.

Figure 14:
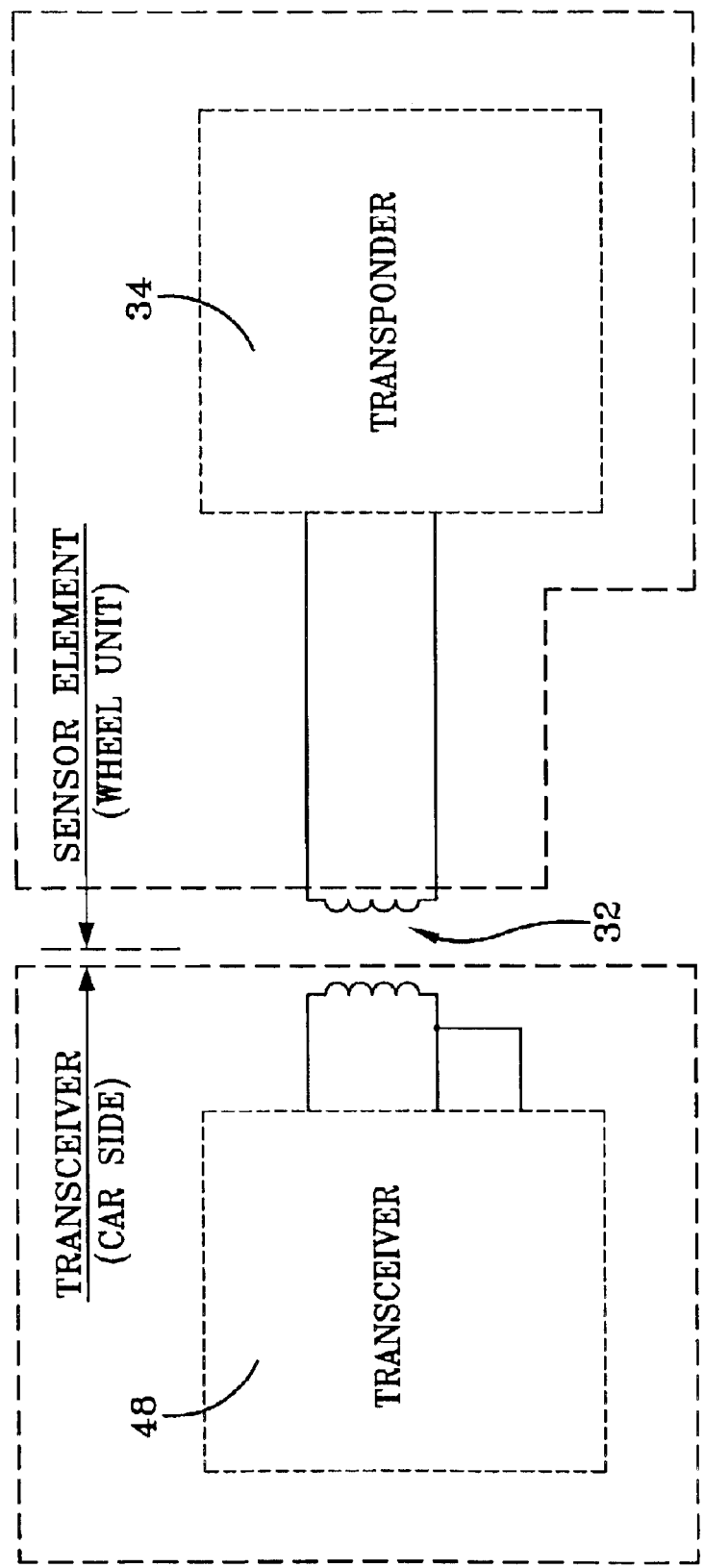
FIG. 14 is a block diagram of the car transceiver and tire monitoring system.

FIG. 14 depicts in schematic form the transceiver, transponder, and antenna system.

From the foregoing, it will be appreciated that the shown embodiment overcomes the deficiencies in known systems and methods for housing a transponder and transformer in an annular tire monitoring system. Pursuant to the shown embodiment, the tag housing is at least partially embedded into a non-conductive carrier strip to form a ring assembly to render the antenna and tag housing unitarily transportable. The carrier strip further acts to protect the integrity of the antenna loop and the transponder components. Such an assembly may be incorporated into a tire during the tire manufacturing process but preferably is attached to the tire by adhesives or other known methods in a post-manufacture attachment procedure. The carrier strip protects the integrity of the antenna wire and transponder encapsulated therein; creates a unitary assembly that may be conveniently transported, inventoried, and deployed to retrofit existing tires with a monitoring system or to replace defective components should the need arise, maintains the antenna in an optimal relationship to the transponder toroidal body through which it extends, and serves to facilitate an optimal orientation of the transponder relative to the tire cavity.

Pursuant to the invention, the tag housing is of stepped elongate profile that provides advantages in the manufacture and assembly of the annular apparatus. The configuration of the tag housing makes the housing self-centering in a mold and provides angular sides that abut against mold block sidewalls to inhibit the flow of carrier strip material into the mold block cavity. The sensor port through the upper surface of the housing snout is thereby maintained in an open and operative condition and potentially damaging contact between carrier strip material and the transponder within the housing compartment is avoided.

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. A tag housing for an annular assembly comprising:
    opposed sidewalls and a bottom wall defining an internal chamber therebetween;
    a flange projecting outward from the periphery of the housing and having an upper flange surface;
    first sidewall portions disposed above the flange surface and intersecting the flange upper surface at a prescribed angle;
    upper sidewall convergent portions extending to an upper surface and defining with the upper surface a housing snout; and
    a portal extending through the upper surface in communication with the internal chamber.

2. A tag housing as set forth in claim 1, wherein the sidewall first portions intersect the upper flange surface at substantially a right angle.

3. A tag housing as set forth in claim 1, wherein a lower portion of the housing has a bore extending there through in communication with the internal chamber.

4. A tag housing as set forth in claim 1, wherein the housing includes a carrier strip surrounding a lower portion of the housing and the housing snout projecting free of the carrier strip.

5. A tag housing as set forth in claim 4, wherein the housing is embedded within the carrier strip substantially up to the peripheral flange.

6. A tag housing as set forth in claim 5, wherein the housing is elongate in a longitudinal direction.

7. A tag housing as set forth in claim 6, wherein the carrier strip maintains the elongate housing in an upright position.

8. A tag housing as set forth in claim 6, wherein the carrier strip maintains the elongate housing in a flat position.

9. An annular apparatus comprising:
    an annular carrier strip;
    a tag housing at least partially embedded within the carrier strip and including opposed sidewalls and a bottom wall defining an internal chamber therebetween and a flange projecting outward from the periphery of the housing and having an upper flange service;
    the sidewalls having first portions disposed above the flange surface and intersecting the flange upper surface at a prescribed angle and converging portions disposed above the first portions and extending to an upper surface, and
    the housing further having a portal extending through the upper surface in communication with the internal chamber.

10. An annular apparatus according to claim 9, wherein the first sidewall portions intersect the upper flange surface at substantially a right angle.

11. An annular apparatus according to claim 9, wherein a lower portion of the housing has a bore extending there through in communication with the internal chamber.

12. An annular apparatus according to claim 9, wherein the tag housing is embedded within the carrier strip substantially to the peripheral flange.

13. An annular apparatus according to claim 9, wherein the tag housing is elongate in a longitudinal direction and the carrier strip maintains the elongate housing in an upright position.

14. An annular apparatus according to claim 13, wherein the tag housing is elongate in a longitudinal direction and the carrier strip maintains the elongate housing in a flat position.

15. An annular apparatus according to claim 9, wherein the sidewall converging portions and the portal project free from the carrier strip.

16. An annular apparatus according to claim 9, wherein further including an annular antenna at least partially embedded within the carrier strip.

17. An annular apparatus according to claim 9, wherein further comprising: a toroidal transformer in electromagnetic coupled relationship with the antenna and residing within the housing chamber.

18. A method of manufacturing an annular apparatus comprising an annular antenna coupled to a transponder through a toroidal transformer having a toroidal opening, the method comprising the steps of:
    positioning the transformer and transponder within a tag housing, the tag housing having a chamber defined by opposed sidewalls and a bottom wall, the tag housing further having a flange projecting outward from the periphery of the housing, upper convergent sidewall portions extending to an upper surface, and a sensor port extending through the upper surface in communication with the housing chamber;
    positioning the annular antenna and the tag housing within a mold with the housing convergent surfaces located within a mold cavity defined by cavity sidewalls;

positioning an upper surface of the peripheral flange and housing sidewall portions superior to the flange in close abutting relationship with portions of the cavity sidewalls; and injecting carrier strip material into the mold to at least partially encapsulate the antenna and a lower portion of the tag housing.

19. A method according to claim 18, wherein comprising the further step of terminating the induction of carrier strip material into the mold at a level where the carrier strip material reaches the housing flange to allow the convergent housing surfaces to remain free of the carrier strip.

20. A method according to claim 18, further comprising:

optionally aligning the tag housing into either a flat or an on-end orientation relative to the carrier strip.

* * * * *